UNITED STATES PATENT OFFICE.

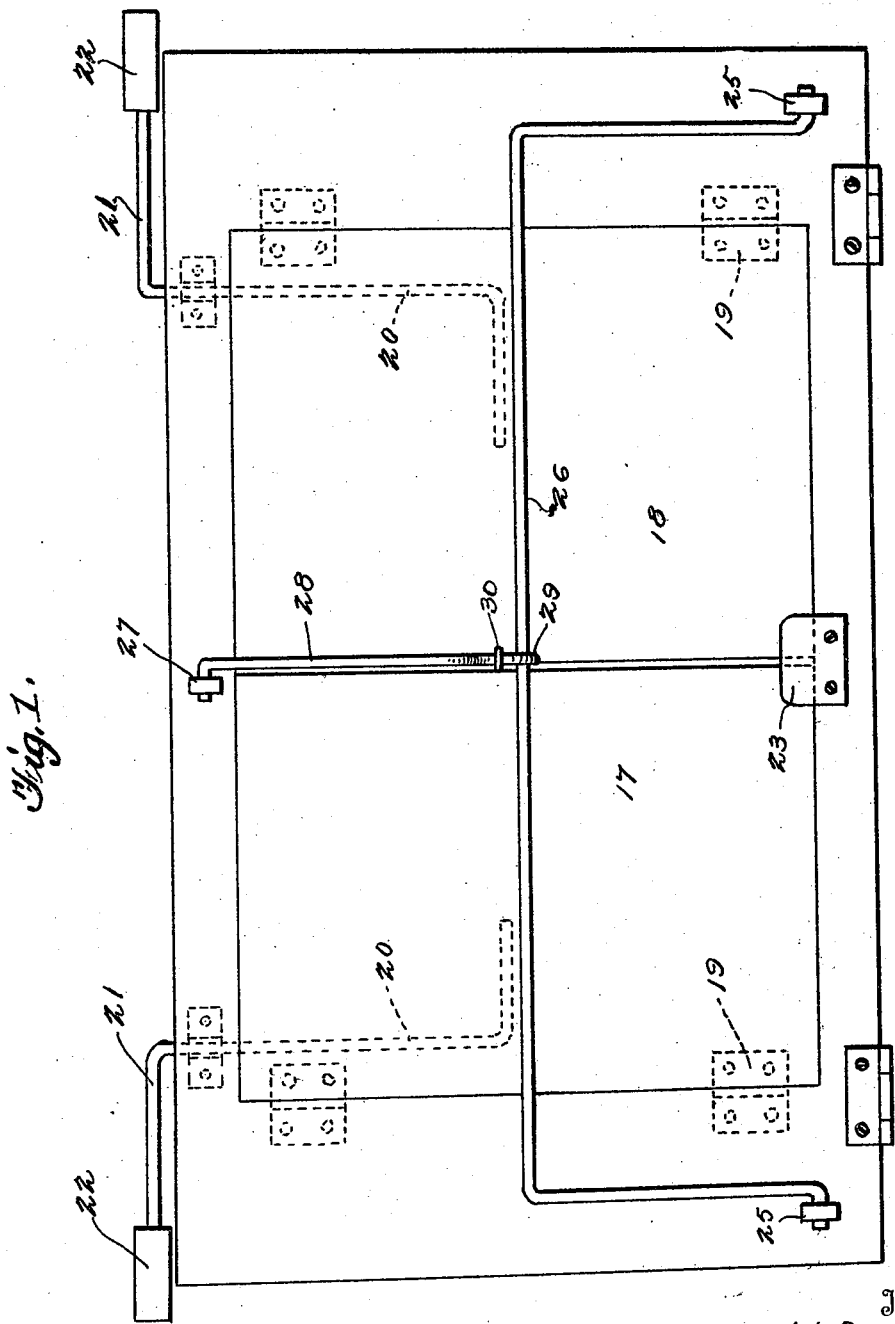

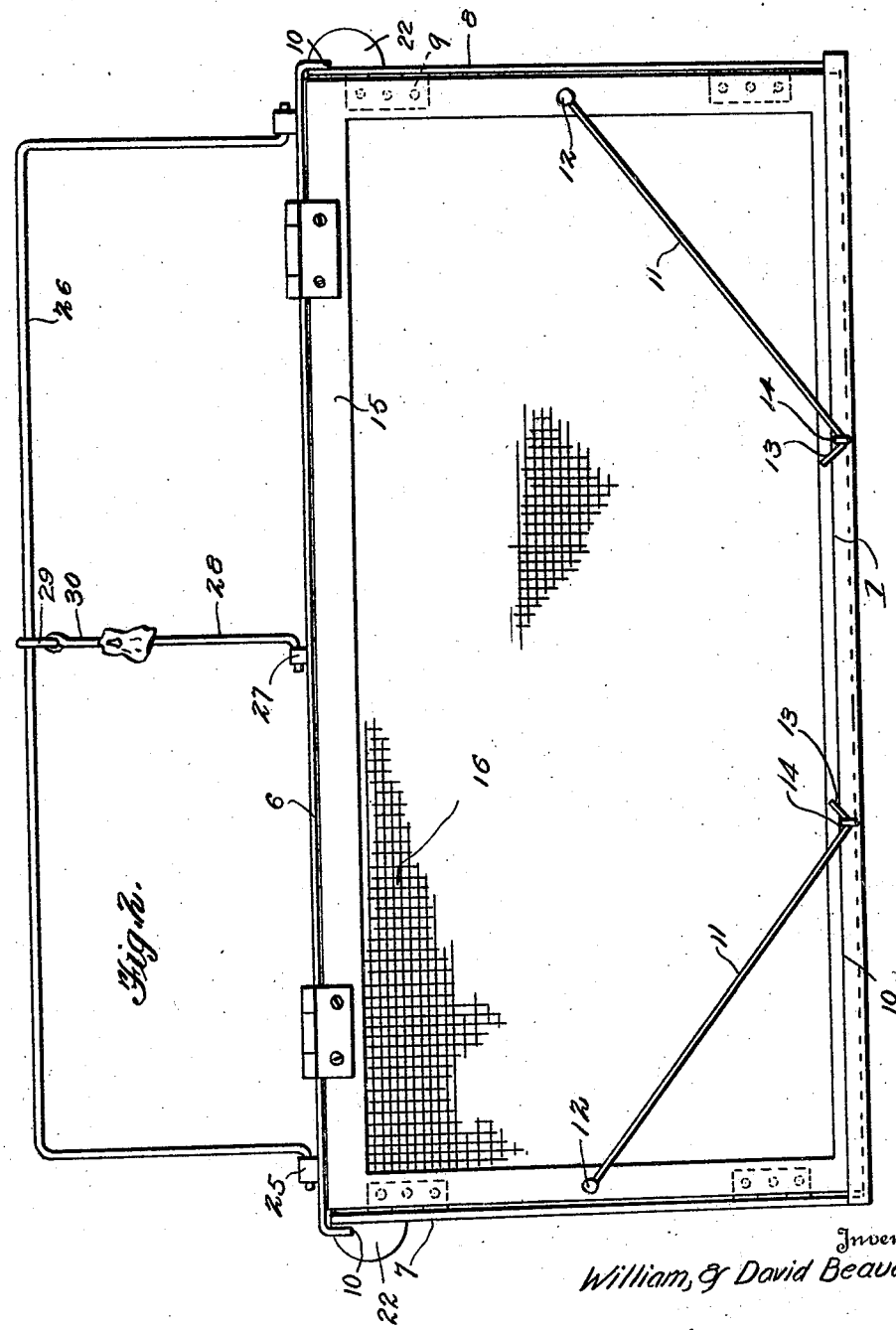

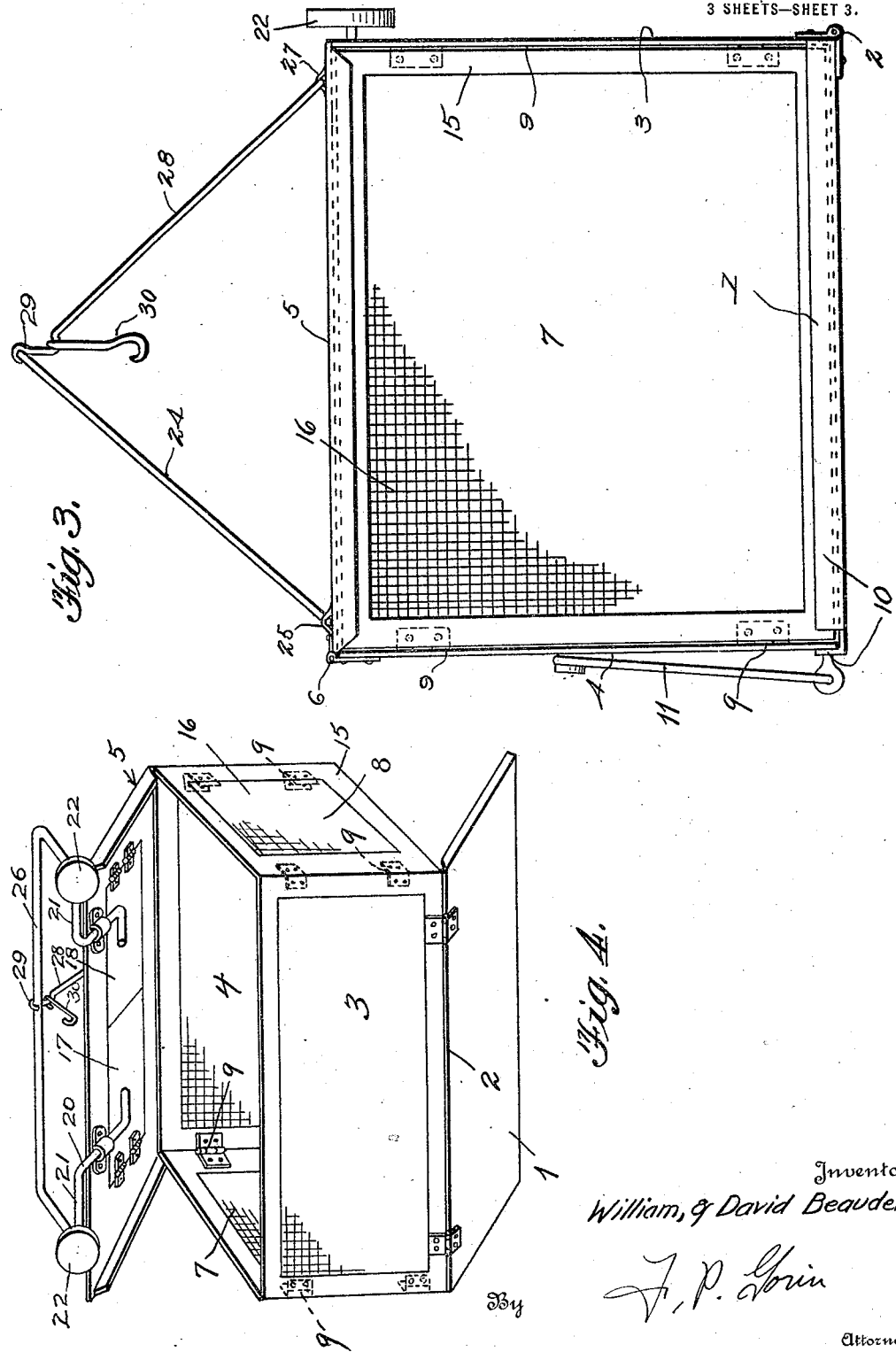

DAVID BEAUDETTE AND WILLIAM BEAUDETTE, OF MANETTE, WASHINGTON.

ANIMAL TRAP.

1,413,701. Specification of Letters Patent. Patented Apr. 25, 1922.

Application filed June 25, 1921. Serial No. 480,477.

*To all whom it may concern:*

Be it known that we, DAVID BEAUDETTE and WILLIAM BEAUDETTE, citizens of the United States, and residing at Manette, in the county of Kitsap and State of Washington, have invented certain new and useful Improvements in Animal Traps, of which the following is a specification.

This invention relates to an animal trap wherein the trap structure is made up in sections movably connected to permit the trap as a whole to be arranged in collapsed condition to occupy but little space in storage or shipment.

The trap further provides normally supported trap doors which yield under the weight of the animal, in an attempt to reach the bait, to precipitate the animal into the trap proper.

The invention also contemplates the provision of means for supporting the bait in proper relation to the trap door, which means are readily movable to occupy but little space when the trap structure is collapsed.

In the drawings:

Fig. 1 is a plan view of the improved trap.

Fig. 2 is a side elevation of the same.

Fig. 3 is an end elevation of the same.

Fig. 4 is a view of the trap structure in flat relation showing the connection of the various parts to permit folding or collapsing.

The improved structure comprises a trap bottom 1 of appropriate width and length, to which along one longitudinal edge is hingedly supported at 2, a trap side 3. The opposite side 4 is hingedly connected to the cover section 5, as at 6, and the respective ends 7 and 8 are hingedly connected at 9 to the respective sides 3 and 4, as shown in Fig. 3.

The free edges of one of each of two meeting parts are formed at 10 with metal extensions forming receiving channels for the free edge of the other of such parts, whereby the parts are connected into rectangular trap form. Hooks 11 hingedly connected to one part at 12 are formed so that their hook terminals 13 engage eyes 14 on an opposing part, such as the bottom 1 to thus secure the respective parts in trap forming relation, as will be apparent more particularly from Fig. 2 of the drawings. The sides and ends of the trap are preferably each formed of a rectangular frame work 15 and a metallic screen-like filling 16 to complete the part.

The top of the trap is formed to provide similar door sections 17, 18, hingedly connected to the top at 19, so that their meeting edges extend transverse the top. The doors are mounted for a free downward movement and are normally held against said movement by a bar 20 secured to the underside of each door and projecting through the edge frame of the top, said bar being then extended laterally at 21 and provided with a counterweight 22, which slightly overbalances the weight of the doors. The frame work of the top is provided with a stop 23 to overlie the doors and limit their upward movement under the influence of the weights to a position substantially in the plane of the top.

A bait support is provided in the form of a bail 24 hingedly supported at 25 adjacent one longitudinal edge of the top, the cross bar 26 of the bail extending longitudinally of the top. In line with the door division, the top is further provided, through a pivotal support 27, with a bait rod 28, the free end of which is formed with a hook 29 adapted to be engaged with the cross bar of the bail when said bail and hook are elevated, as shown in Fig. 3. The bait rod is provided with a pendent hook 30 on which the bait is placed. This arrangement suspends the bait hook and bait immediately above and in alignment with the division between the doors.

In the attempt of the animal to reach the bait, he is compelled to step or walk upon the doors 17, which thus move downwardly to precipitate the animal into the trap proper. The doors when relieved of the weight of the animal immediately return to normal position through the counterweights described.

When not desired for use as a trap, as in storage or transportation, the entire structure may be readily collapsed into a compact package in an obvious manner, the hinge connection of the various parts being designed to permit this collapse.

Claim:

A trap, comprising a bottom, top, side walls and end walls, the side and end walls being hinged together at the ends thereof and the top and bottom having one edge hinged to the side walls for forming a rectangular body, means on the side walls engaging the bottom for securing the bottom thereto in trap forming position, a pair of trap doors formed in the top and hinged thereto at opposite ends, counterweights for holding said doors closed, and a bait support collapsibly mounted above the meeting ends of said doors, whereby the trap may be folded into a flat compact form when not in use.

In testimony whereof we affix our signatures.

DAVID BEAUDETTE.
WILLIAM BEAUDETTE.